R. EICKEMEYER.
Hat-Forming Machine.

No. 212,910. Patented Mar. 4, 1879.

Witnesses:
Philip F. Larner
H. Bartle

Inventor:
Rudolf Eickemeyer
By ________
Attorney

R. EICKEMEYER.
Hat-Forming Machine.

No. 212,910. Patented Mar. 4, 1879.

Witnesses:
Philip F. Larner
H. Bartle

Inventor:
Rudolf Eickemeyer
By Wm Wood
Attorney

R. EICKEMEYER.
Hat-Forming Machine.

No. 212,910. Patented Mar. 4, 1879.

R. EICKEMEYER.
Hat-Forming Machine.

No. 212,910. Patented Mar. 4, 1879.

Witnesses:
Philip F. Larner
H. Bartle

Inventor:
Rudolf Eickemeyer
By M. C. Moss
Attorney

R. EICKEMEYER.
Hat-Forming Machine.

No. 212,910. Patented Mar. 4, 1879.

Witnesses:
Philip F. Larner
H. Bartle

Inventor:
Rudolf Eickemeyer
By Wm C Byrd
Attorney

UNITED STATES PATENT OFFICE.

RUDOLF EICKEMEYER, OF YONKERS, NEW YORK.

IMPROVEMENT IN HAT-FORMING MACHINES.

Specification forming part of Letters Patent No. 212,910, dated March 4, 1879; application filed July 24, 1878.

*To all whom it may concern:*

Be it known that I, RUDOLF EICKEMEYER, of Yonkers, in the county of Westchester and State of New York, have invented certain new and useful Improvements in Hat-Forming Machines; and I do hereby declare that the following specification, taken in connection with the drawings furnished and forming a part of the same, is a clear, true, and complete description thereof.

My said improvements relate to machines which form wool hat-bodies, and which, in their operation, clothe or cover a double block with a woolen lap as it is delivered from carding-machines. This double block is supported on four conical rollers and rotated by them, and these require adjustment at various angles, so as to properly support and drive blocks of different sizes and shapes, and also properly condense the wool as it is taken on by the block. Provision has heretofore been made whereby these conical rollers may be adjusted in pairs, first on one side of the machine and then on the other; but as they must be adjusted to the block, and as the latter is in no manner fixed, and is larger in the middle than at the ends, the adjustment can seldom be effected except after several attempts at each side of the machine, and only then practically when the machine is at rest.

One object of my present invention is to so construct the portion of the frame which supports the axes of the conical rollers that all of them may be simultaneously set at any desired angle, and so render them promptly adjustable to any desired block even while the machine is in motion. This latter capacity is of great consequence, because thereby the carding-machine may continue in operation during the brief time required for adjustment by reason of my invention. This feature of my invention consists in the combination, with the four supporting-rollers and their axes, of pendent pivoted counterpart frames, on each of which two rollers are mounted, and an adjusting-screw, which controls simultaneously both frames. The advantages in time saved in the extremes of adjustment by this feature of my invention are about as one minute is to from thirty to sixty minutes. This portion of my invention is not limited to supporting-rolls mounted in a vibrating frame, because its value in adjustment is the same whether said rolls vibrate or not.

In my machine, and as heretofore, power is communicated from a shaft by gearing to the inner ends of two of the rollers on one side, and these respectively communicate, by bevel-gears at their inner ends, with the rollers on the opposite side, which are in like manner provided with bevel-gears. As heretofore constructed, however, the hinging or pivoting of the roller-axes has been effected at their inner ends, and therefore at every change of angle the bevel-gears would variably mesh with each other to such an extent as would frequently prevent their being driven smoothly and regularly. I obviate all this by reason of another feature of my invention, which consists in the combination, with the supporting-rolls, their main frame, their axes, and their bevel-gears, by which they are rotatively connected, of a pair of roller-frames, which are pivoted to each other and to the main roller-frame in a line which corresponds with the pitch-line of the bevel-gears on the rollers, and therefore, regardless of the angles at which the rollers are set, their bevel-gears will always properly mesh and co-operate to drive the rollers smoothly and evenly.

As heretofore constructed, the shaft from which power is derived for driving the supporting-rollers has been fixed with relation to the frame of the machine, and therefore when the rollers were set at various angles their gears variably meshed with the gears on their driving-shaft.

In my new machine the relations between the gearing on the roll-driving shaft and on the rolls are fixed, so that, regardless of the angles at which the rollers may be set, the gearing will mesh with uniformity; and my invention further consists in the combination, with supporting-rollers which are mounted on axes and held by pendent pivoted frames, of a driving-shaft which is mounted upon one of said pivoted frames and moves with it during adjustment, and maintains with its gearing at all times uniform relations with the gears on the rollers driven by it.

As heretofore, my supporting-rollers are moved to and fro in a laterally-vibrating frame, and the power for driving the roller-shaft is derived from a larger shaft below, having a double-faced bevel-gear, which meshes with a similar gear (on a stud in said frame) in a line coincident with the line of the pivots on which said frame vibrates. In these prior machines, however, the power is communicated to the roller-shaft from the larger shaft below by an inclined shaft with bevel-gears at each end; but this mode of gearing would not operate properly on my machine, because the roller-shaft moves with one of the pendent roller-frames during its adjustment, instead of being stationary, as heretofore; and in this connection my invention further consists in the combination, with the vibratory roller-frame, the pendent frames pivoted thereto, and the roller-shaft mounted on one of the pendent frames, of a chain of gearing mounted on studs in the vertical portion or stem of the frame, and connected, respectively, with the roller-shaft above and a main driving-shaft below. With this method of gearing the upper gear of the chain will always properly mesh with the gear on the roller-shaft, because their axes are always parallel, and the latter gear has merely to roll upon the periphery of the other in assuming the various positions in adjustment.

Inasmuch as the vibrations of the roller-frame are for the purpose of alternately placing the opposite ends of the double block into position to properly receive the bat from the carding-machines, it is obvious that the extent of vibration should be exactly equal in both directions, and also that its speed in moving to and fro should be uniform. Originally the vibratory movement was attained by a crank motion; but this was accompanied with such unsatisfactory results that a planetary gear motion was substituted therefor. But I have still further improved this portion of the machine by another feature of my invention, which consists of the combination, with the vibrating roller-frame, of a driving-gear and a sliding cross-head, operatively connected with the gear by a crank-pin, (usually provided with a roller,) and with the vibrating frame by a link. As heretofore, the link and vibrating frame are adjustably connected, so as to vary the extent of the vibratory movement. The cross-head is moved with absolute uniformity by the crank-pin on the driving-gear, and in like manner it vibrates the roller-frame. This uniformity in the vibration of the roller-frame and block is of great practical importance, because without it the hat-bodies formed on the two ends of the block would be of unequal weight.

In prior machines of this class the organization has been such that when the block is to be removed and the vibrating frame stopped it was liable to stop at either end of its vibratory movement, and this is objectionable, as the last layer of the bat or web of wool should be at the center; and another portion of my invention consists in the combination, with the vibrating frame and its operative mechanism, of stopping mechanism, which can be operated only when the vibrating frame is midway in its vibratory movement.

It will be understood that the supporting-rolls and the forming-block continue to revolve after the stopping of the vibrating frame; and this latter being stopped while the block is broadside to the front and square to the web, it admits of the forming of two hat-bodies of a certain weight at the tip and side crown, and an increased weight or thickness at the brim and band, because any desired number of layers of the web can be applied to the center of the block after it has ceased to vibrate.

The particular stopping mechanism preferred and employed by me constitutes another portion of my invention; and this consists in the combination, with the vibratory frame and its drive-gear, however they may be connected, of a flange on said gear, broken at one point or at two opposite points in its periphery, a treadle which disconnects the driving-gearing, and a lever provided with an arm carrying a friction-roller, which rides on the flange of the gear, and by dropping into one of the breaks or openings therein permits the gearing to be disengaged, and secures the stoppage of the frame midway of a vibratory movement.

If the flange be broken away at one point instead of at two, the stoppage of the vibration is possible only at a greater interval than if two breaks are employed; but these breaks, whether one or two be provided, are each so located that they will enable the stopping devices to operate when the cross-head is exactly midway of its stroke, and this will necessarily secure the stoppage of the roller-frame midway of its vibratory movement.

The speed at which the roller-frame is vibrated must, of course, be varied according to the size of block used, because the carding-engines should be and are, in practice, driven at a certain uniform speed, and therefore they deliver the web regularly, and this must be taken up on the block, whether it be large or small, at a rate exactly corresponding to the delivery of the web from the cards; and in this connection I have made several improvements, which will now in general detail be considered:

As in prior machines, I employ cone-pulleys for belting with the shafting of a mill; but these are for use with reference to attaining the maximum speed desired at the pulley-shaft for driving the supporting-rollers and revolving the block at a proper rate of speed; but there is required an intermediate adjustment of speed with reference to the vibration of the roller-frame, for this must be moved slower with a long block than with a shorter one, so as to properly take up the web from the cards. Heretofore in these machines this intermediate adjustment of speed has been effected by means of separate change-gears, which involved the removal of one and the substitution of another, and to fill the exact requirements in selection involved close attention and the loss of considerable time.

The main shaft of the machine is continuously connected with the supporting-rollers; but the driving-gear of the vibrating frame is connected therewith by means of a counter-shaft and intermediate gearing; and the principal feature of my invention in this connection consists in the combination, with the main driving-shaft, the vibrating frame, its counter-shaft, and intermediate gearing, of a set of change-gears consecutively arranged as to size, and a splined sliding gear for engagement therewith, whereby the speed in the vibration of the roller-frame may be varied, and the change promptly and accurately effected.

I prefer the sliding gear to be on the counter-shaft; and to obviate the necessity of employing a set-screw for maintaining it on the shaft longitudinally, and to secure its meshing only with the proper change-gear, my invention further consists in the combination, with the driving-shaft in a hat-forming machine, and the counter-shaft which vibrates the roller-frame, of a sliding gear and a set of change-gears, which are separated by flanges, which prevent the movement of the sliding gear on its shaft when meshed with either of the change-gears.

For promptly engaging the sliding gear on the counter-shaft with or disengaging it from the change-gear, my invention further consists in the combination, with the main shaft, the change-gear, and the sliding gear, of a counter-shaft for operating the vibrating roller-frame, which is mounted in a swinging frame, so that said counter-shaft and its gear may be moved to and from the main shaft and its gearing. The counter-shaft is preferably so mounted in its swinging frame that, instead of being parallel with the main shaft, it is parallel with the pitch-line of the several change-gears considered as a whole, so that the sliding gear will engage equally well with the largest and the smallest of the change-gears, and this construction in the combination previously stated constitutes another feature of my invention. The counter-shaft may, however, be parallel with the main shaft, and I hereinafter show and describe a machine embodying such a construction.

It is immaterial whether the change-gears be on the counter-shaft or on the main shaft in either arrangement referred to; but when the two shafts are not parallel, the one carrying the sliding gear should be parallel with the pitch-line of the change-gears.

In order that the gears on the main and counter shaft shall not crowd each other, I provide a stop, which limits the inward movement of the swinging frame, and this constitutes another feature of my invention.

In order that the counter-shaft and the intermediate gearing may be properly meshed with the drive-gear of the vibrating roller-frame at all times regardless of the position of the counter-shaft frame, I have pivoted the counter-shaft frame in the plane occupied by the drive-gear, and this constitutes another feature of my invention.

For conveniently controlling the swinging frame, the counter-shaft, and the gearing, I have provided said counter-shaft frame with a treadle, which enables the operative to use his foot for disconnection, and at the same time use both hands for handling the block or adjusting the sliding gear to the change-gears.

The counter-shaft, main shaft, the change-gearing, and swinging counter-shaft frame, with a treadle, in combination, constitute another feature of my invention.

As before stated, the vibrating roller-frame is provided with mechanism whereby the roller-frame can be stopped only at a point midway of either vibratory movement; and my invention further consists in the combination, with the vibrating roller-frame and mechanism which controls the proper stoppage of the roller-frame, the main gear, the change-gears, the counter-shaft and its gear, the swinging frame in which the counter-shaft is mounted, and a treadle which controls the counter-shaft frame, and is, in turn, controlled by the stopping mechanism, so that the counter-shaft can only be disconnected from the main shaft when the stopping mechanism is ready to operate to stop the roller-frame midway of its vibratory movement.

The link which operatively connects the sliding cross-head to the vibrating roller-frame is adjustable both with reference to its length, whereby it may be elongated, and also with reference to its distance from the roller-frame, which frame is provided with a curved arm, slotted to receive the bolt or pin at one end of the link. The combination of these parts thus constructed with the stopping device constitutes another feature of my invention, whereby the extent of the vibratory movement of the roller-frame may be varied, and at the same time secure the operation of the stopping device at a point midway of either vibratory movement.

So far as my knowledge extends, machines of this general class have never heretofore been provided with means whereby the padding or condensing of the web upon the block could be effected automatically.

As before stated, the weight of the block and the action of the supporting-rolls serve to pad or condense those portions of the web interposed between block and rolls; but the web at both ends of the block has heretofore been padded solely by the hand of the operative, and any neglect of this end padding results in a damaged hat.

In this connection I have made several improvements; and another feature of my invention consists in the combination, with the supporting-rolls and the forming-block, of an automatic padder, which has a movement to and fro in the line of the axis of the block, and by pressure thereon pads or condenses the web on the end thereof.

I provide such a padder for each end of the forming-block, and while one is in action the other is sufficiently removed from the opposite end of the block to enable the web to be laid in place thereon; and these devices, in combination with mechanism for alternately operating them in harmony with the vibratory movements of the supporting-rolls, constitute another feature of my invention.

These padders may be varied in form and material; but for attaining the best results they should operate with a yielding pressure approximating more or less closely to that incident to pressure by the hand of the workman, and this characteristic may be attained in the use of padders composed of elastic material, having a smooth surface; or inelastic material may be used in connection with springs for affording the yielding pressure; and the combination, with the immediately co-operative devices, of padders which operate with yielding pressure constitute another feature of my invention.

The special means employed by me for attaining the automatic padding of the web at the ends of the block consist of trumpet-shaped padding-rolls mounted on a sliding rod, provided with springs for securing a yielding pressure as between the padding-rolls and the forming-block, a vertical bell-crank lever, which moves the rod to and fro longitudinally, a forked lever pivoted to the under side of the vibrating roller-frame, and which is connected at one end to the lower end of the bell-crank lever, and embraces with its fork a vertical fixed post, so that when the roller-frame is vibrated the padders are alternately made to operate at the proper time, and during that part of the vibratory movement at which the web is being laid upon the opposite end of the forming-block; and this particular combination of mechanism constitutes another feature of my invention.

A prior invention of mine, patented as a communication from me in England, A. D. 1873, No. 487 of the annual series, which is also made the subject of an application for United States Letters Patent now pending, embraces web tending mechanism by which the web is supported after leaving the carding-machine, and automatically delivered to the forming-block; but prior thereto, so far as my knowledge extends, no means had ever been devised whereby the tending operation could be automatically performed; and neither those or any similar means had ever been applied to public use in this country prior to my present invention, the web having theretofore been extended directly from the carding-machine to the forming-block, and for its delivery thereto, the varying position of the forming-block, its rotation, and its draft on the web, together with manipulation by the operative, have been solely relied upon.

In my prior machine the web-supporting bed or guide at its outer end was mounted on a straight shaft, vibrated to and fro with a rocking motion; and because of the bed being thus straight or flat its delivery of the web to the two ends of the forming-block was imperfectly performed; and one of my improvements thereon relates particularly to a curved web-guide, by which the web may be consecutively placed in closer proximity to the two opposite ends of the forming-block than with my former machine. The web-guide or bed of my former machine was vertically adjustable, and its vibrations were variable, both as to their extent and to the number of vibrations in a given time, and it had also a revolving or moving surface.

In these connections I have made several important improvements, and the following-described devices and combinations of mechanism constitute other separate features of my invention: The combination, with the forming-block and the supporting-rolls, of a curved web guide or tender, for laying the web evenly upon the block circumferentially; the combination, with a forming-block and its supporting-rolls, of a vibrating curved web-guide, for laying the web diagonally thereon, and also well covering the ends of the block; the combination of a vibrating block and a vibrating curved web-guide, whereby the two co-operate in the laying of the web evenly and truly diagonally on the periphery of the block from end to end, and also cause the ends of the block to be fully and evenly covered; the combination, with the supporting-rolls, the forming-block, and a vibrating curved web guide or tender, of mechanism for varying the extent of the vibratory movements of the web-guide, so that it may properly co-operate with blocks of different lengths; the combination, with the vibrating rolls, the block, and the vibrating curved web guide or tender, of mechanism for varying the time of the vibrations, so that said guide may be moved sufficiently in advance of the vibratory movement of the block to secure proper tension on the web, which should be varied in accordance with the bulk of the web and the character of wool employed; the combination, with the rolls and block, of a curved web guide or tender, and mechanism by which the guide may be adjusted vertically, so as to properly co-operate with blocks of different diameters; the combination, with the supporting-rolls, the block, and the end-padding devices, of a vibrating web-guide, timed in its movements to co-operate with the padding devices; the combination, with the vibrating rolls and block, of a revolving curved web-guide, whereby a weak web composed of short wool may be delivered to the block without unduly straining or weakening it, and meantime maintaining it in a position favorable to its delivery upon the two ends of the forming-block.

The coarse long wools afford webs strong enough to stand such strain as is incident to its passage over a wire guide which does not revolve; and as the guide is bent in order to properly control the web, the revolving guide is made of flexible material, which, although occupying a curved line, may nevertheless be freely revolved on its curved axis.

Although slightly different as to the time of their movements, the vibrations of the web-guide and the vibrating rolls and block are sufficiently in harmony to permit of their deriving the vibratory motion from the same source; and my invention further consists in the combination, with the roller-frame, the gear which vibrates it, and its intermediate connecting mechanism, its rolls, and forming-block, of a web-guide, which is also vibrated by the rotation of said gear.

My curved web-guides are so mounted that they are capable not only of being adjusted vertically, but also toward and from the forming-block, and such a curved web-guide constitutes another feature of my invention.

To more particularly describe my invention, I will refer to the accompanying drawings, of which there are eight sheets.

Figure 3:
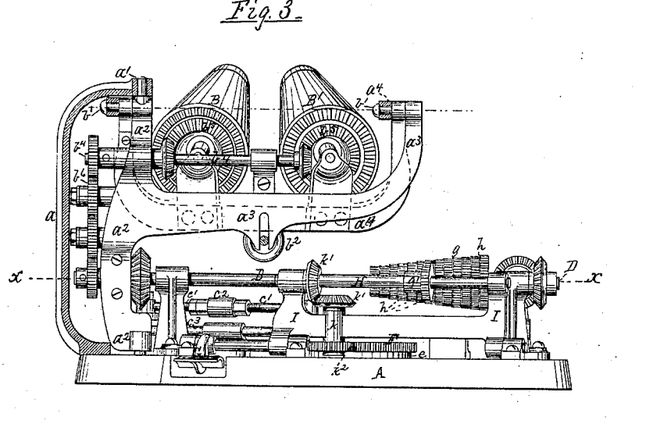
Fig. 3, Sheet 2, is a side view of a similar machine, with the rolls on the front side removed, together with the pendent frame in which they are mounted.
Figure 4:
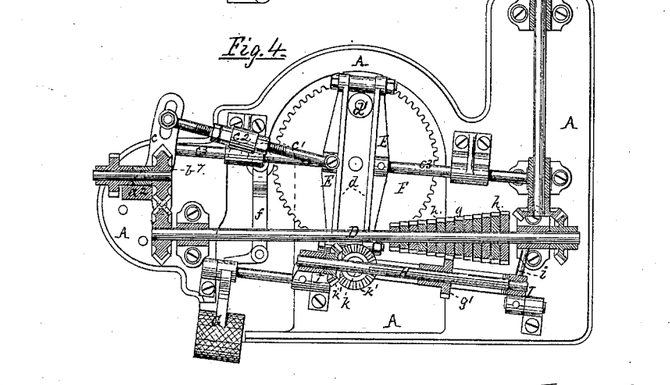
Fig. 4, Sheet 2, is a horizontal longitudinal section of the machine on line $x\ x$, Fig. 3.
Figure 5:
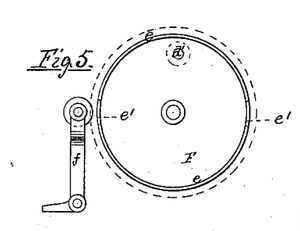
Fig. 5, Sheet 2, represents the stopping devices, by which the vibrating frame is controlled.
Figure 6:
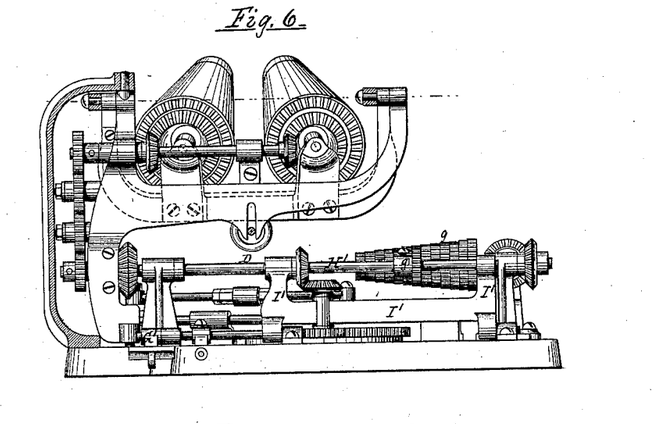
Figs. 6, 7, and 8, Sheet 3, represent, in similar views, the machine shown in Figs. 1 and 2, for particularly showing the arrangement of the counter-shaft, change-gears, and stop-motion as differing from that in Figs. 3 and 4.

The detailed description first presented is in connection with Figs. 3, 4, and 5 on Sheet 2.

The machine is preferably mounted upon a solid cast-iron bed-plate, A, at the rear end of which is mounted a vertical curved standard, $a$, provided with a vertical bearing, $a^1$, at its upper end, for the reception of a pivot on the stem of the main roller-frame $a^2$, which is also pivoted in the bed-plate, at its foot, in line with the bearing $a^1$, thus far substantially as heretofore. The arm $a^3$ of the roller-frame, instead of being straight, as heretofore, is curved upward at its outer end.

The conical supporting-rolls B B$^1$ B$^2$ B$^3$ are arranged in pairs on opposite sides of the machine, in this respect as heretofore; but each is mounted on its proper axis $b$, and each pair is supported by a pendent frame, $a^4$, both of which frames are bow-shaped and pivoted on horizontal studs $b^1$, one of which is in the stem of the roller-frame $a^2$, and the other in line therewith at the upper end of the arm $a^3$ of said frame.

Figure 9:
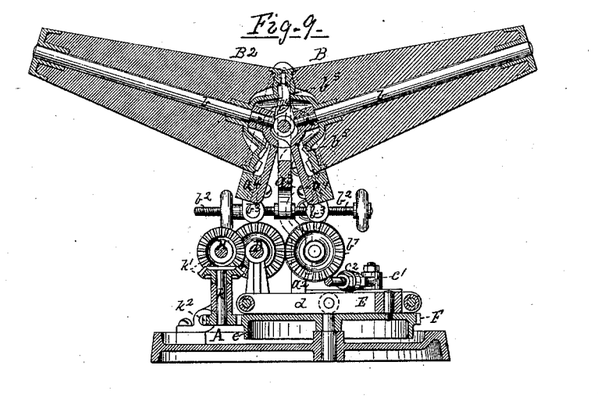
Fig. 9, Sheet 4, is a vertical lateral section of the machine, Fig. 2, through the two front rollers.
Figure 10:
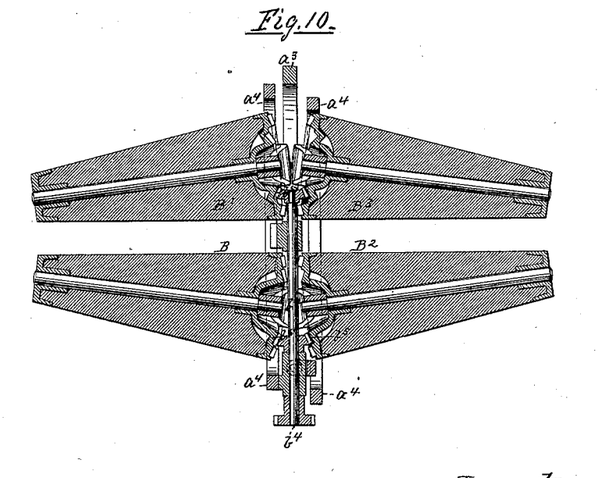
Fig. 10, Sheet 4, is a sectional view of the rollers, the adjacent driving mechanism, and the frame of the machine.
Figures 17, 19:
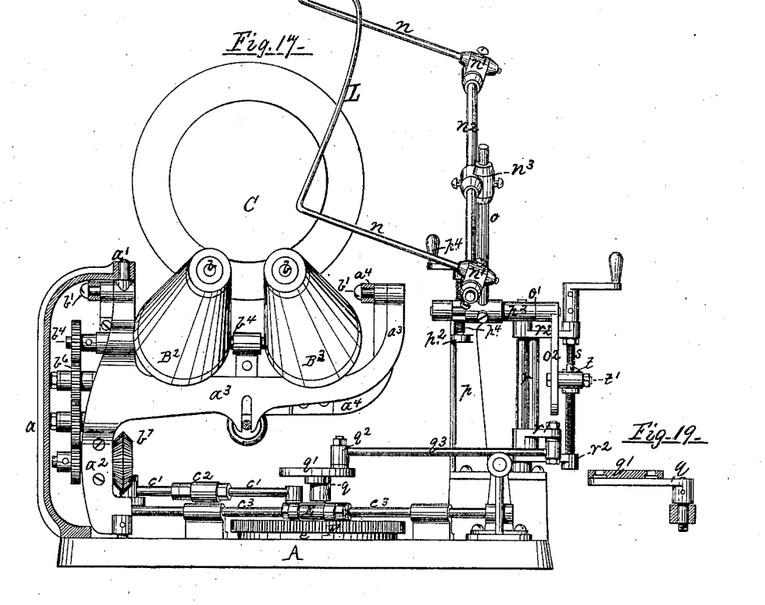
Fig. 17, Sheet 6, is a side view of a hat-forming machine without its roll-driving mechanism, but with my novel web guide or tender attached.
Fig. 19, Sheet 6, is a sectional view of the disk, which, moving with the drive-gear, imparts motion to the web guide or tender.
Figure 18:
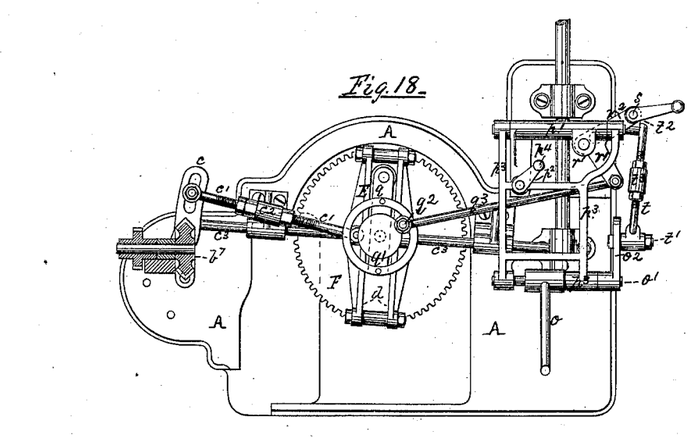
Fig. 18, Sheet 6, is a horizontal section of the machine, Fig. 17, in two lines, one below the web-guide and the other below the roller-frame.
Figure 20:
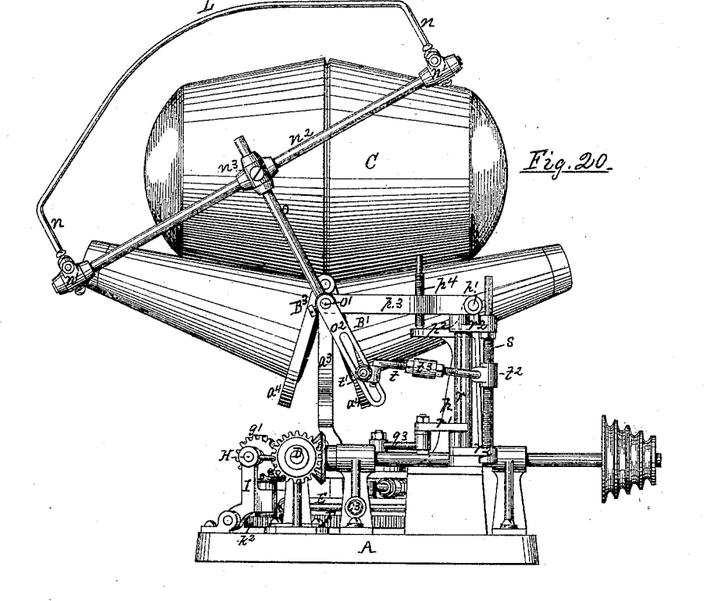
Fig. 20, Sheet 7, is a front-end view of a machine provided with one form of my novel web guide or tender.
Figures 21, 22:
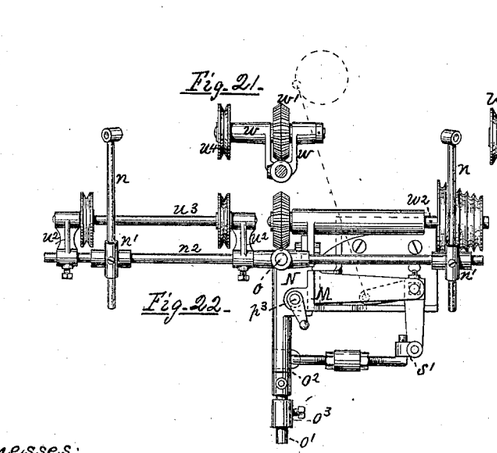
Figs. 21, 22, and 23, Sheet 7, represent the details of the mechanism by which my novel flexible web guide or tender is revolved.

The forming-block C, Figs. 17 and 20, is as heretofore. It has the general form of two conic frustums, rounded at the small ends and joined together at their bases, and is supported and revolved by the co-operative action of the four rolls, as heretofore. Of course different sizes of blocks require the proper angular adjustment of all the rolls, and this is effected by means of an adjusting-screw, $b^2$, Fig. 9, which is rotatively housed centrally in a bearing on the arm $a^3$ of the main roller-frame. This screw is both right and left hand, and its threads are respectively housed in threaded holes in rotating nuts provided with bearings $b^3$ on the lower edge of each of the pendent frames, so that the angular adjustment of all the rolls is simultaneously effected by turning the screw $b^2$ in one direction or the other. The two rolls B and B$^1$ on one side of the machine are provided with bevel-gears $b^5$, which mesh with gears on a roller-driving shaft, $b^4$, which occupies bearings secured to the pendent roller-frame, which supports said two rolls. Power is communicated by each of these rolls to its opposite fellow by means of other larger bevel-gears on their ends. These last-named gears always maintain proper relations with each other regardless of the angular adjustment of the rolls, because the pendent frames are pivoted at $b^1$ to the main roller-frame in a line which corresponds with the pitch-line of said gears. The gears on the roller-shaft $b^5$ also always maintain proper relations with the gears $b^4$ on the rolls B B$^1$, regardless of the angular position of the latter, because the bearings of said roller-shaft are mounted upon the same pendent frame, and therefore move with it and the rolls. To provide for the easy driving of this roller-shaft $b^4$, regardless of its varied position, its gear meshes with a pinion, $b^6$, mounted on a stud in the stem of the main roller-frame, and these two gears, having axes which are always parallel, mesh with ease and smoothness. The pinion $b^6$ is driven by a chain of gearing similarly mounted, (see Fig. 3,) to the lowest of which power is communicated through a shaft carrying a double-faced bevel-gear, $b^7$, Fig. 4, which meshes with a similar gear on the end of the main shaft D of the machine, to which power is usually applied by a rectangular shaft and cone-pulley, as shown in several of the figures.

The vibration of the main roller-frame, the rolls, and the block carried thereon is effected by mechanism next described. At the foot of the stem of the main roller-frame $a^2$ is a laterally-projecting arm, $c$, (see Fig. 4,) slotted and curved to receive a screw-stud on the end of link $c^1$, which is composed of two parts, oppositely threaded at one end and housed within a threaded sleeve, $c^2$, whereby said link may be shortened or lengthened. The opposite end of link $c^1$ is pivoted centrally to a cross-head, E, which, for securing a movement in a true line, is provided at each side with guide-rods $c^3$, moving in suitable bearings supported by the bed-plate. The cross-head is provided with a central straight slot, $d$, at right angles to its guide-rods, and it is moved to and fro by the large horizontal gear F, which revolves on a vertical stud stepped in the bed-plate. The gear and cross-head are operatively connected by a crank-pin on the gear, preferably provided with a friction-roller, $d^1$, which properly fills the slot $d$ in the cross-head. When the gear is revolved, the cross-head, through the link and arm, vibrates the main roller-frame to precisely the same extent in both of its movements.

It is desirable that when the vibration of the roller-frame ceases it should be only when the rolls are standing squarely to the front, so that the portion of the web last laid on the forming-block should extend equally toward both ends of the block, and its substance be equally divided between the two incipient hat-bodies formed thereon. This result is attained by means of a stopping mechanism, as follows: There is a downwardly-extending flange, $e$, on the under side of gear F, which is broken away, affording openings, as at $e^1$, at opposite points of its periphery, as shown in Fig. 5. The horizontal bell-crank lever $f$, pivoted to the bed-plate, is provided at the end of its long arm with a roller, which either rides on the periphery of the flange $e$ or drops into one of the openings $e^1$, according to circumstances. The short arm of the bell-crank lever is abutted by a treadle-lever, G, which, in any desired manner, may be arranged to disconnect the driving-gearing which actuates gear F and the cross-head; but, however said disconnection may be effected through the treadle, it will be seen that so long as the roller of the bell-crank lever rides the flange of gear F the treadle-lever cannot be moved; and only at such times as the bell-crank-lever roller occupies an opening, $e^1$, can the vibration of the main roller-frame be stopped, and as said openings are located with reference to a central position of the cross-head, the supporting rolls and block will only be brought to a rest when squarely broadside to the front of the machine.

Power is communicated from the main shaft D to the cross-head gear F, as follows: (See Figs. 3 and 4.) The main shaft carries a set of change-gears, $g$, usually ranging in size from sixteen to thirty teeth. A counter-shaft, H, preferably set angularly to shaft D, so as to be parallel with the general pitch-line of the change-gears, considered as a whole, is provided with a sliding gear, $g'$, splined thereto, which can therefore be made to properly mesh with either one of the change-gears. For holding the sliding gear in proper relation to either of the change-gears, these latter are separated by flanges or washers $h$, which, by contact on either side, prevent the sliding gear from moving longitudinally on the counter-shaft so long as it is in gear. The counter-shaft is mounted in machine, Figs. 3 and 4, upon the top of a swinging frame, I, which is pivoted at its base to the bed-plate of the machine, and is connected with the treadle-lever G, previously described, so that when pressure is applied to the treadle (if permitted by the bell-crank lever $f$) it will swing the frame outward at its top and throw the sliding gear out of mesh with the change-gear. To prevent the gears from unduly crowding, the counter-shaft frame is provided with a stop, $i$, Fig. 4, which, by abutting against its top on the inner side, prevents its undue movement in that direction. The counter-shaft frame I has mounted on it vertically a short shaft, $k$, on the upper end of which is a bevel-gear, $k^1$, which meshes with a similar gear, $k^1$, on the counter-shaft. On the lower end of shaft $k$ is a pinion, $k^2$, which meshes with and drives the cross-head gear F. The pinion $k^2$, gear F, and the pivots of the frame I all occupy the same plane, so that, regardless of the position of the frame, the gearing will always be properly meshed, with no danger of riding. It will be seen that the change of speed in the vibration of the roller-frame rolls and block can be promptly effected, and if the change-gears and forming-blocks be correspondingly numbered the proper adjustment is but the work of a moment.

Figure 1:
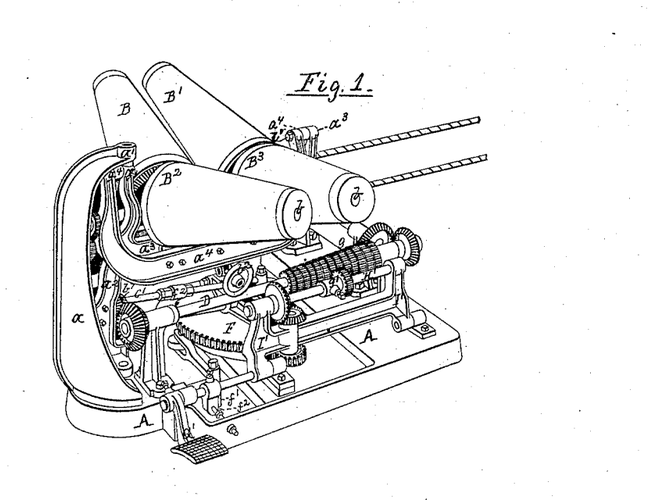
Figure 1, Sheet 1 is a perspective view of a machine embodying several features of my invention, but without those which relate to guiding the web and padding it on the block.
Figure 2:
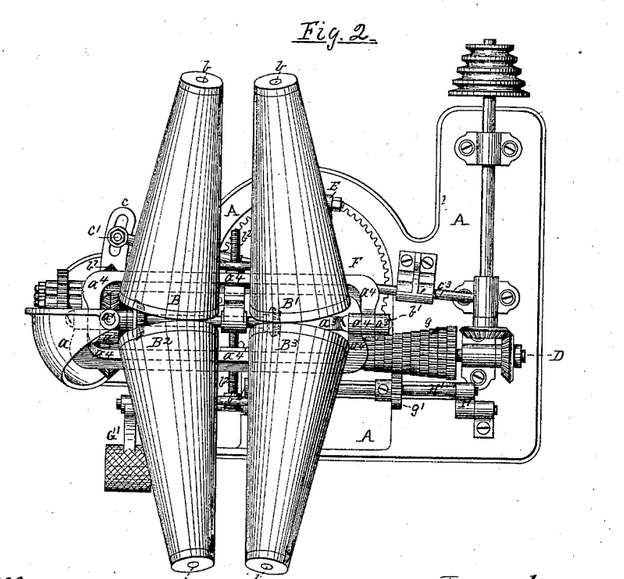
Fig. 2, Sheet 1, is a top or plan view of the same machine.
Figures 7, 8:
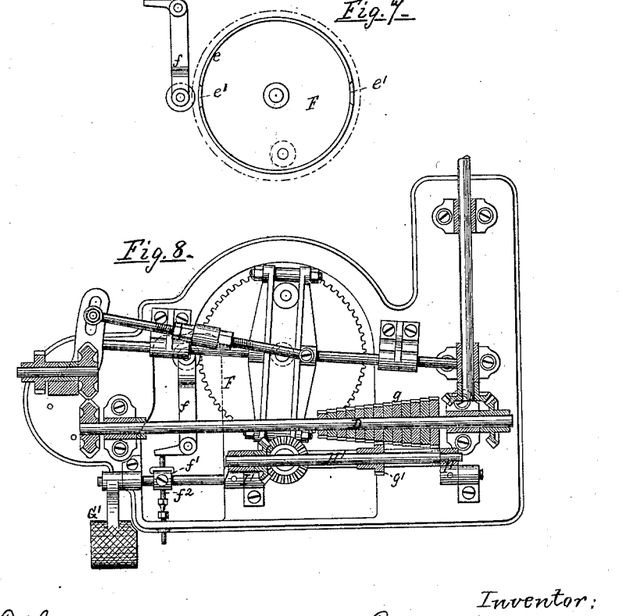

In Figs. 1 and 2, Sheet 1, and 6 and 8, Sheet 3, the arrangement of the counter-shaft H′, swinging frame I′, and treadle-lever G′ are shown in a slightly-modified form. The counter-shaft and its frame, instead of being angular to the main shaft D, are parallel therewith; and instead of having the treadle-lever G′ communicate directly with the bell-crank lever $f$, the treadle-shaft has a pendent arm, $f^1$, carrying screw $f^2$, which abuts endwise against the short arm of the bell-crank lever $f$, as seen clearly in Fig. 8. Otherwise the machine shown in said figures is as before described.

It will be seen that an adjustment of screw $f^2$ to lever $f$ must be made with every change of gear, which is not necessary in the arrangement previously described. With the countershaft parallel with the main shaft, the teeth of the sliding gear and change-gears mesh truly and with little friction, which is not the case with the angular counter-shaft; but the increased friction incident to the angular shaft is believed to be more than offset by the convenience attained in the non-requirement of adjustment at each change, which is necessary with the parallel counter-shaft.

Figures 11, 12, 13:
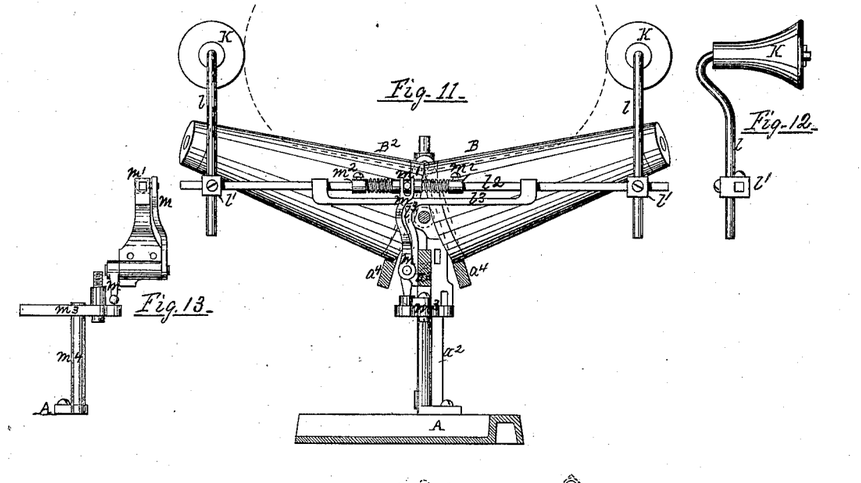
Fig. 11, Sheet 5, is a lateral sectional view of a portion of the machine on a line between the supporting-rolls, and illustrates the padding devices, their operative mechanism, and their relation to the block, which is partially shown in dotted lines.
Fig. 12, Sheet 5, is a side view of one of the padders.
Figs. 13, 14, and 15, Sheet 5, represent, in detail, a portion of the mechanism by which the padders are operated.

The novel automatic padding or condensing operation upon the web at the ends of the forming-block is effected by mechanism which is clearly shown on Sheet 5. In Fig. 11 the vertical outline of the two ends of the forming-block is shown in dotted lines.

The two padders K are preferably in the form of trumpet-shaped rolls, so that their outline on one side will correspond practically with the one-half of the horizontal outline of the block across its end. These padders are loosely mounted on their axes, and each is provided with a vertical standard, $l$, fitted vertically in a block, $l^1$, which is in turn fitted to slide on a square rod, $l^2$, said block being provided with set-screws for maintaining a fixed vertical adjustment of the padders, and also their fixed adjustment longitudinally on said rod. It will be seen that when this rod is moved to and fro the two padders will alternately move toward and away from the adjacent ends of the forming-block, and when properly adjusted that they will, by vibrating and rolling action, compress or pad the web at the ends of the block.

The square rod $l^2$ is supported in a rectangular standard, $l^3$, provided with slide-bearings, and mounted upon the vibrating roller-frame $a^3$, between the two pendent roller-frames $a^4$. The rod is moved to and fro by the vibration of the main roller-frame, and therefore the padders must operate in true time with the vibrations of the forming-block; and they are so arranged as to only operate upon the end thereof which is alternately farthest from the web, and at the same time the opposite padder is so located that it cannot obstruct the proper laying of the web upon the opposite end of the block. The square rod $l^2$ has, midway of its length, a loose sleeve, provided with a stud, which is embraced by the fork of a vertical crank-lever, $m$, having two arms and a rock-shaft pivot, which is mounted on the arm $a^3$ of the vibrating roller-frame.

The loose sleeve $m^1$ is connected with the rod at each side by means of springs, which encircle the square rod, and at their outer ends they are respectively connected thereto by a sleeve and set-screw, $m^2$. When, therefore, the vertical lever is moved to and fro on its pivot, the padders, by reason of the springs, act with yielding pressure upon the web.

The vertical lever, at its lower end, is in engagement, by means of a link, with the short arm of a forked horizontal lever, $m^3$, which is pivoted to the under side of the arm $a^3$ of the vibrating roller-frame. The space between the forks of the horizontal lever is partially occupied by the upper end of a rigid post, $m^4$, mounted on the bed-plate.

Figures 14, 15, 16:
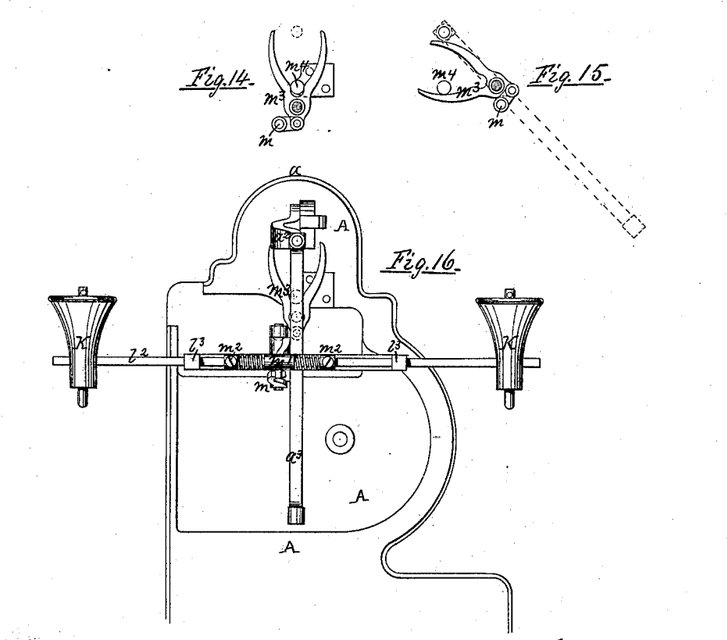
Fig. 16, Sheet 5, is a top view of the padders and their operative mechanism.

When the vibrating roller-frame stands straight toward the front of the machine, as indicated in Fig. 14, the post and forked lever occupy such relations as will locate the padders at equal distance from the ends of the forming-block; but when the roller-frame is swung to one side, as shown in Fig. 15, the forked lever is thrown to one side, thereby moving the sliding rod and causing the padder at the rearmost end of the block to operate upon the web.

The padders need not necessarily be capable of revolving, or be of the form shown, because an automatic intermittent padding pressure is what I seek to attain, regardless of the precise mechanism employed.

The novel mechanism by which the web is automatically guided to the forming-block and presented thereto smoothly and evenly is fully illustrated on Sheets 6, 7, and 8. The machine shown in Figs. 17, 18, 19, and 20, Sheets 6 and 7, is provided with a web guide or tender suitable for use with a web of considerable tensile strength, such as is attainable with the long coarse wool commonly used for the purpose.

The web guide or tender L therein shown consists of a curved rod, well polished, and provided with rectangular arms $n$, which, at their outer ends, are held in heads $n^1$, so fitted that the arms may be moved therein to and fro longitudinally, and secured in adjustment by set-screws. The heads $n^1$ are also provided with tubular bearings, so that thereby the web-guide may be mounted upon a straight rod, $n^2$. Other set-screws are also provided in these heads, whereby the web-guide may be mounted upon the round straight rod, and firmly set thereon at any desired position.

The curve in web-guide enables it to maintain good control over the web while moving with it to and fro, and also causes the web to be smoothly distended laterally.

The straight rod $n^2$ is, in turn, mounted centrally in a head, $n^3$, provided with a tubular bearing for the rod, and a set-screw which secures the rod longitudinally therein, and also prevents its rotation.

The web guide or tender is supported by a vertical lever, $o$, composed of two arms and a rock-shaft or pivot, and is secured thereto by the central head $n^3$, which has a bearing or housing to receive the lever, and also a set-screw, whereby it may be secured at any desired height thereon.

For supporting the web-guide and its lever a framing is provided, consisting of a vertical standard, $p$, mounted upon one corner of the bed-plate, and provided at its top with an arm, $p^1$, which extends toward the front and affords a tubular bearing. At a short distance from the top, extending to one side, it has another arm, $p^2$, which affords a bearing for the end of an adjusting-screw, hereinafter described.

The web-guide lever $o$ is mounted on a rock-shaft, $o^1$, at the outer end of which is a slotted arm, $o^2$, these really constituting, in effect, a simple lever, pivoted at the rock-shaft. The rock-shaft $o^1$ is mounted in bearings at the outer end of a rectangular frame, $p^3$, which, at its inner end, is pivoted on a rod within the tubular bearing in the arm $p^1$ of the vertical standard $p$. The frame $p^3$ has a tapped hole, containing an adjusting-screw, $p^4$, the lower end of which bears upon the top of the arm $p^2$, on standard $p$, before described.

The turning of the adjusting-screw $p^4$ will elevate or lower the outer end of frame $p^3$, and it thereby affords a vertical adjustment of the web-guide, so that it may be placed at any desired position with reference to the upper surface of the forming-block.

The vibration of the web-guide to and fro is effected by the vibration of the lever $o$; and, as the extent of the vibrations of the web-guide and forming-block so far correspond as to enable them to properly co-operate, it is desirable that the web-guide be vibrated by the gear which vibrates the roller-frame. This is effected in a simple manner by rigidly mounting on the crank-pin of gear F, by means of an arm, $q$, a slotted disk, $q^1$. (Shown in Figs. 17, 18, and 19.) This disk has a crank-pin, $q^2$, which is adjustable by means of a screw-shank and nut at any desired point in the circular slot of the disk. This crank-pin is connected with a vertical swinging frame, $r$, (pivoted at top and bottom, respectively, to the arm $p^1$ of standard $p$, and to the foot-plate of said standard,) by means of a link, $q^3$, and a projecting arm, $r^1$, near the foot of the frame $r$. The frame $r$ has also two other horizontal arms, $r^2$, one at the top, the other at the bottom, thereof, and these are parallel with each other, but stand in the frame at right angles to the arm $r^1$, to which the link is connected. These arms, at their outer ends, carry a vertical crank-screw, $s$, which is supported in a step on the lower arm, and housed in a bearing in the upper, so that it may be freely rotated. This screw $s$ and the lower or slotted end, $o^2$, of the web-guide lever $o$ are connected by a link, $t$, which, at one end, unites pivotally with a threaded wrist-pin, $t^1$, in the slot of the lever, and at the other end unites pivotally with a threaded head, $t^2$, on the vertical screw $s$.

The link $t$ is constructed in two parts, oppositely threaded at their coincident ends, and united by a sleeve, $t^3$, whereby said link may be shortened or lengthened.

It will be seen that as the gear F and the slotted disk $q^1$ revolve, the frame $r$ will be vibrated to and fro on its vertical pivots, and that the web-guide will be vibrated through the lever $o$, which is actuated by the frame $r$; also, that by properly locating the crank-pin $q^2$ in the slot of disk $q^1$, the swinging vibrations of the web-guide may be adjusted so as to move sufficiently in advance of the vibrations of the forming-block to attain a desirable tension on the web.

It will also be seen that the change-gears previously described perform the same office with reference to the adjustability of the vibrations of the web-guide that they do with reference to the forming-block in vibrating its supporting-rollers and their frame; and that, if I had not organized my machine as shown, it would be necessary to employ a double set of change-gearing, one for the roller-frame, and another for the web-guide.

It will also be seen that the padding devices previously described are timed with reference to the movements of the vibrating web-guide, so that when the guide is laying the web at one end of the block the adjacent padder is so far removed therefrom as to not obstruct the operation.

As before stated, the web-guide shown is suitable only for a strong web, which will withstand the dragging friction incident to the movement of the web over the guide. A short-wool web will not withstand this friction, and I therefore have devised a guide which, although curved, as is necessary, is revolved, so that it eases the web in its passage over it, and obviates all drag thereon by moving at a rate of speed which corresponds with the speed at which the web is delivered from the carding-machine. This flexible revolving web-guide is mounted in a manner slightly different from that previously described; but it possesses like capacities for adjustment.

Figure 23:
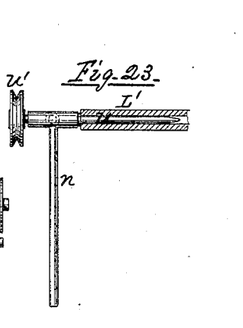
Figures 24, 25:
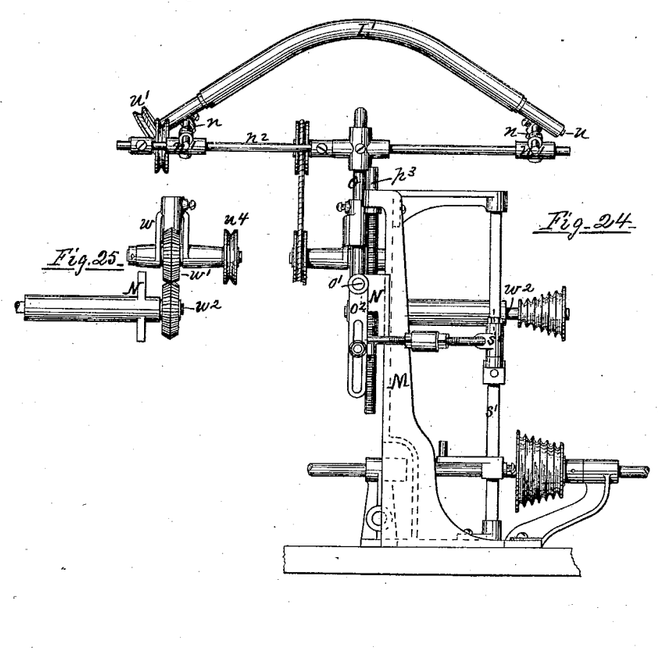
Figs. 24, 25, and 26, Sheet 8, represent the flexible web guide or tender with its operative mechanism, and illustrates the manner in which it is mounted on the machine.
Figure 26:
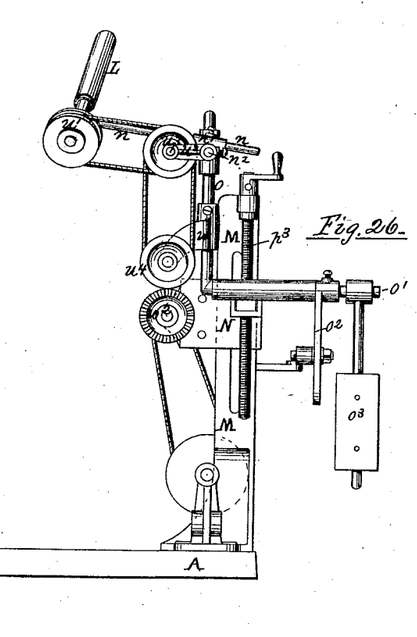

The web-guide L′, Figs. 23, 24, and 26, Sheets 7 and 8, is flexible, preferably tubular, and composed of fine-surfaced well-vulcanized india-rubber, and this may be profitably treated on its surface with some one of the several well-known gums in solution which are not liable to be injuriously affected by such oily matter as may be present in the wool. At each end it is provided with a short shaft, $u$, Fig. 23, which has a bearing housed in a sleeve at the end of an arm, $n$, and one of these shafts is also provided with a grooved pulley, $u^1$. The arms are connected by heads $n^1$ to a straight rod, $n^2$, and are adjustable therein, substantially as previously described. This straight rod is provided with brackets $u^2$, which support a counter-shaft, $u^3$, carrying two grooved pulleys, one of which bands with the pulley $u^1$ on the web-guide L′. The web-guide, straight rod, and counter-shaft are mounted, as a whole, upon a vertical vibrating lever, $o$, which is substantially as before described; but said lever also carries a bracket, $w$, containing a shaft provided with a double-faced bevel-gear, $w^1$, and a grooved pulley, $u^4$, which bands with one of the pulleys on the counter-shaft $u^3$. The double-faced bevel-gear $w^1$ meshes with a similar gear below on a shaft, $w^2$, provided with a cone-pulley, which bands with and is driven by the shaft below, from which power is derived for the entire machine. The pitch-line of these two double-faced gears is coincident with the axis or pivot of the vertical vibrating lever, so that, regardless of the angles which the latter may assume, the gears will still be properly meshed.

Instead of connecting the slotted end $o^2$ of the vertical vibrating lever by a link, $t$, to a vertical screw, as before, a substitute for the latter is provided in a vertical pivoted square shaft, $s'$, and the link is rendered adjustable by means of a sliding head and a set-screw, so that, at whatever vertical adjustment the web-guide may be, the link may be readily adjusted to a horizontal position, as before.

The standard M, which supports the web-guide, is, of course, constructed so as to properly accommodate the operative mechanism.

The vertical adjustment of the web-guide can be effected by means of the head and its set-screw, by which it can be set at any desired height on the vertical vibrating lever; but a further means of adjustment, operative while the machine is in motion, is provided as follows: The vertical lever $o$, its rock-shaft, slotted arm $o^2$, the shaft $w^2$, the double-faced gear $w^1$, and its counterpart are all mounted in a sliding block, N, fitted to guides in the standard, and supported by the adjusting-screw $p^3$, so that by turning the latter the web-guide may be raised and lowered.

The banding employed may be of the elastic varieties; or well-known belt-tightening devices may be employed for maintaining pulley contact whenever any position assumed in adjust-ment causes the bands to slacken.

With a view to offsetting the weight of the mechanism carried with a web-guide of this character by the vibrating vertical lever, I provide the outer end of its rock-shaft or pivot $o^1$ with a pendent counter-balance, $o^3$.

The operation of the several parts of the machine has been so far set forth in connection with the detailed descriptions as to render it unnecessary to further enlarge thereon.

Although I have shown and described a machine in Fig. 20 which embodies many of the several features of my invention, (only excepting those which relate to the padders and the flexible web guide or tender,) it is to be distinctly understood that certain portions of my invention may be and are intended by me to be separately employed. The supporting-rollers may be mounted in accordance with my invention, and applied to any hat-forming machine of this class now in use; and the same is true of the means whereby the main roller-frame is evenly vibrated, with or without the stopping mechanism and change-gears. Also, the padders and their operative mechanism may be applied to such machines without any of the additional novel features described by me; and so also can the curved web guide or tender be separately applied to any machine, and in this connection it will be observed that both forms of web-guide may be provided for in any one machine, requiring only that its bed-plate be so constructed and pierced with bolt-holes as will enable the standards of either form to be mounted thereon and properly secured, so that a manufacturer changing from long to short wool can adjust to suit himself; or the flexible guide and its mechanism may be applied to a machine and be accompanied with the non-flexible non-rotary guide, so that the latter could be attached and properly operated when desired, the rotating mechanism being meantime rendered inoperative by detaching its initial band. My curved web guide or tender in either form, whether it vibrate or not, is also of value for use with a forming-block which does not vibrate.

There are many other subdivisions of my invention which, to persons skilled in the art, will be obviously capable of use independently of other portions thereof; and I am well aware that many changes may be made in the mechanical details, and in the arrangement of the mechanism, without departing from the true spirit of my invention; and I therefore do not limit any portion of my invention to the precise construction and arrangement herein shown and described.

Having thus described my invention, I claim as new and desire to secure by Letters Patent—

1. The combination, with the main frame and the four supporting-rolls of a hat-forming machine, of pendent pivoted frames and an adjusting-screw, substantially as described, whereby said rolls may be simultaneously adjusted to forming-blocks of various sizes, as set forth.

2. The combination, with the supporting-rolls, their main frame, their axes, and the bevel-gearing by which they are rotatively connected, of a pair of roller-frames, which are pivoted to each other and to the main frame in a line which corresponds with the pitch-line of the bevel-gears on the rollers, substantially as described, whereby, regardless of the angles at which the rollers may be set, their bevel-gears will properly mesh with each other, as set forth.

3. The combination, with the pendent pivoted frames, the rollers, and their inner bevel-gears, of a driving-shaft, which is mounted on one of said frames, and carries bevel-gears for driving the rollers, substantially as described, whereby, regardless of the position of said frame, the shaft and its gearing and the rollers and their gearing will maintain uniform relations, as set forth.

4. The combination, in a hat-forming machine, of its main shaft, rollers mounted in pendent frames on a vibrating main frame, and a roller driving-shaft mounted on one of the pendent frames, of a chain of gearing mounted on studs in the vertical portion or stem of the main frame, and communicating at the top with the roller-driving shaft, and at the bottom with the main shaft of the machine, substantially as described, whereby, regardless of the movement of the roller-driving shaft with the frame on which it is mounted, the gear on said shaft will smoothly mesh with the upper gear of the chain, as set forth.

5. The combination, with the vibrating roller-frame in a hat-forming machine, of a driving-gear and a sliding cross-head, operatively connected with a crank-pin on said gear, and also with the roller-frame, substantially as described.

6. The combination, with the driving mechanism, by which the roller-frame of a hat-forming machine is vibrated, of stopping mechanism, substantially as described, whereby the vibration of the roller-frame can only be stopped midway of its vibratory movement, as and for the purposes set forth.

7. The combination, with the vibrating roller-frame and its drive-gear, of a flange on said gear, broken away at one point or at two opposite points in its periphery, a treadle-lever which disconnects the driving-gearing, and a lever provided with an arm carrying a roller, which rides on the flange of the drive-gear, and by dropping into one of the breaks of said flange permits the gearing to be disconnected, substantially as described.

8. The combination, with the main shaft of a hat-forming machine, a vibrating roller-frame, a counter-shaft, and intermediate connecting-gearing between it and the roller-frame, of a set of change-gears and a sliding-gear for connecting the main shaft with the counter-shaft, substantially as described, whereby the speed in the vibrations of the roller-frame may be promptly and accurately varied, as set forth.

9. The combination, with the main shaft and the counter-shaft in a hat-forming machine, of a sliding splined gear on one shaft and a set of change-gears on the other, which latter gears are separated by flanges, for maintaining the sliding gear in a fixed position longitudinally on its shaft, substantially as described.

10. The combination, with the main shaft, the change-gears, and the sliding gear in a hat-forming machine, of a counter-shaft mounted in a swinging frame, substantially as described, whereby the gears may be readily connected or disconnected for purposes of adjustment, as set forth.

11. The combination, with the main shaft in a hat-forming machine and a set of change-gears, of a sliding gear and a counter-shaft, the two shafts being angular to each other, and one of them being parallel with the pitch-line of the change-gears, substantially as described, whereby the sliding gear may engage with either of the change-gears.

12. The combination, with the main shaft, the counter-shaft, their gearing, and the swinging frame, of a stop which limits the inward movement of the frame, substantially as described, whereby the gearing is prevented from crowding, as set forth.

13. The combination, with the main driving-gear which actuates the vibratory roller-frame, the counter-shaft, and the vertical shaft which connects by its gearing the counter-shaft with the main gear, of a frame which carries the counter-shaft, the vertical shaft, and its gearing, and is pivoted in the plane occupied by the drive-gear, substantially as described, whereby the gear on the vertical shaft will always properly mesh with the drive-gear regardless of the position of the pivoted frame, as set forth.

14. The combination, with the main shaft, the counter-shaft mounted in the swinging frame, and their change-gearing, of a treadle for controlling the counter-shaft, substantially as described, whereby an operative can disengage the shafting and employ both hands for adjustment of the change-gears or the handling of a block, as set forth.

15. The combination, with a vibrating roller-frame and mechanism for controlling the stoppage of said frame midway of a vibration, substantially as described, the main shaft, the counter-shaft, the change-gears, and the swinging frame in which the counter-shaft is mounted, of a treadle-lever which controls the swinging frame, and is in turn controlled by the mechanism which assures the proper stoppage of the vibrating roller-frame, substantially as described.

16. The vibrating roller-frame, having a curved slotted arm, the sliding cross-head, and the adjustable link which connects the cross-head with the vibrating frame, substantially as described, whereby the extent of the vibratory movement of the roller-frame may be varied, in combination with stopping mechanism which secures the stoppage of the roller-frame midway of a vibration, substantially as described, whereby, whether the roller-frame be vibrated to its fullest or to a lesser extent, it will, nevertheless, be stopped midway of a vibratory movement, as set forth.

17. The combination, with the supporting-rolls and the forming-block, of an automatic padder, substantially as described, whereby the web is padded or condensed at the end of the block, as set forth.

18. The combination, with the vibrating supporting-rolls and the forming-block, revolved and vibrated by said rolls, of a pair of padders, which reciprocate alternately toward and from the ends of said block, substantially as described.

19. The combination, with supporting-rolls and a forming-block, of an automatic padder, which operates with a yielding pressure, substantially as described.

20. The combination, with the vibrating frame, the supporting-rolls, and forming-block, of a pair of padders mounted on a rod, which is reciprocated to and fro by a bell-crank lever and a forked lever, which is in turn caused to vibrate by reason of its contact with a fixed post during the vibrations of the roller-frame, substantially as described, whereby the movements of said padders are effected in the same time with the vibrations of the roller-frame, and made to operate alternately upon the rearmost end of the forming-block, as set forth.

21. The combination, with a forming-block and supporting-rolls, of a curved web guide or tender, substantially as described, whereby the web is laid evenly upon the block, as set forth.

22. The combination, with a forming-block and supporting-rolls, of a vibrating curved web guide or tender, substantially as described.

23. The combination, with a vibrating forming-block and supporting-rolls, of a vibrating curved web guide or tender, substantially as described.

24. The combination, with the supporting-rolls, the forming-block, and vibrating curved web guide or tender, of mechanism, substantially as described, for varying the extent of the vibratory movements of the web-guide, whereby it may properly co-operate with blocks of different sizes, as set forth.

25. The combination, with the supporting-rolls and the vibrating curved web guide or tender, of mechanism, substantially as described, for varying the time of the vibrations of the web-guide, and to cause the latter to move sufficiently in advance of the forming-block to secure a desirable tension on the web, as set forth.

26. The combination, with the supporting-rolls and the forming-block, of a curved web-guide, which is adjustable vertically, substantially as described, to enable it to properly co-operate with blocks of different diameters, as set forth.

27. The combination, with the supporting-rolls, the forming-block, and the padders, of a vibrating web-guide, timed in its movements to lay the web at the end of the block in advance of the operation of the padders, substantially as described.

28. The combination, with the vibrating rolls and forming-block, of a revolving curved web guide or tender, substantially as described, whereby a weak web of wool may be delivered to the block without unduly straining the web, as set forth.

29. The combination, with the vibrating main roller-frame, the forming-block, and the vibrating web-guide, of a drive-gear, connected with the vibrating roller-frame and the web-guide, substantially as described, whereby the block and web-guide are separately vibrated for proper co-operation, as set forth.

30. In a hat-forming machine, a curved web-guide, which is adjustable vertically and laterally with reference to the forming-block, substantially as described.

R. EICKEMEYER.

Witnesses:
ROBT. P. GETTY,
F. MÜLLER.